ись

United States Patent
Suzuki

(10) Patent No.: US 9,116,743 B2
(45) Date of Patent: Aug. 25, 2015

(54) STORAGE MEDIUM, INFORMATION PROCESSING APPARATUS, AND MIGRATION METHOD

(75) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 13/370,383

(22) Filed: Feb. 10, 2012

(65) Prior Publication Data

US 2012/0233285 A1    Sep. 13, 2012

(30) Foreign Application Priority Data

Mar. 10, 2011    (JP) ................................. 2011-053337

(51) Int. Cl.
G06F 15/173    (2006.01)
G06F 9/48    (2006.01)
G06F 9/455    (2006.01)

(52) U.S. Cl.
CPC .......... *G06F 9/4856* (2013.01); *G06F 9/45558* (2013.01); *G06F 2009/4557* (2013.01)

(58) Field of Classification Search
CPC .............. G06F 15/173; G06F 9/45558; G06F 9/45533; G06F 2009/4557; G06F 9/4416; G06F 9/455; G06F 15/161
USPC ........................................................ 709/216
See application file for complete search history.

(56) References Cited

U.S. PATENT DOCUMENTS

| 6,898,670 | B2 * | 5/2005 | Nahum | 711/114 |
| 7,555,596 | B2 * | 6/2009 | Tolba | 711/112 |
| 8,209,680 | B1 * | 6/2012 | Le et al. | 717/174 |
| 8,407,702 | B2 * | 3/2013 | Ikegaya et al. | 718/1 |
| 2006/0153188 | A1 | 7/2006 | Doi et al. | |
| 2007/0237162 | A1 | 10/2007 | Hamanaka et al. | |
| 2009/0007099 | A1 | 1/2009 | Cummings et al. | |
| 2009/0150463 | A1 | 6/2009 | Sekiguchi et al. | |
| 2013/0185420 | A1 * | 7/2013 | Shimogawa | 709/224 |

FOREIGN PATENT DOCUMENTS

| JP | 2006-190141 A | 7/2006 |
| JP | 2009-145931 A | 7/2009 |
| WO | 2006/040811 | 4/2006 |

OTHER PUBLICATIONS

JPOA—Office Action dated Jun. 17, 2014 issued with respect to the Japanese Application No. 2011-053337, with English-language translation.

* cited by examiner

*Primary Examiner* — Kevin Bates
*Assistant Examiner* — Nazia Naoreen
(74) *Attorney, Agent, or Firm* — Fujitsu Patent Center

(57) ABSTRACT

A computer-readable storage medium stores program code for causing a computer to perform a method. The method includes steps of creating a redundant configuration including a physical device used by an operating system of the computer and a virtual device of a virtual machine running on another computer connected via a network to the computer, based on identification information of the virtual device; and transferring memory contents of the operating system to the other computer.

15 Claims, 16 Drawing Sheets

FIG.8

| DEVICE TYPE | DEVICE ID | DEVICE NAME | REDUNDANCY SCHEME |
|---|---|---|---|
| NIC | 021b:8139 | Rtl8139 | BONDING |
| STORAGE | 8086:7010 | 82471SB IDE CONTROLLER | RAID1 |
| ... | ... | ... | ... |

1224

STORAGE MEDIUM, INFORMATION PROCESSING APPARATUS, AND MIGRATION METHOD

CROSS-REFERENCE TO RELATED APPLICATION

This application is based upon and claims the benefit of priority of Japanese Patent Application No. 2011-053337 filed on Mar. 10, 2011, the entire contents of which are incorporated herein by reference.

FIELD

The embodiments discussed herein are related to a storage medium, an information processing apparatus, and a migration method.

BACKGROUND

Migration of an operating system (OS) from a physical machine to a virtual environment is performed by copying a disk image (information stored in a secondary storage unit such as a hard disk drive (HDD)) of the OS from the physical machine to a virtual machine. This technology makes it possible to migrate an OS running directly on a physical machine to a virtual machine running on another physical machine.

However, with a method of copying a disk image of an OS from a physical machine to a virtual machine, it is necessary to start the OS on the virtual machine based on the copied disk image. In other words, it is necessary to restart the OS during the migration. Restarting an OS indicates the loss of continuity of a process (or service) being executed on the OS.

Here, Japanese Laid-Open Patent Publication No. 2009-145931 discloses a technology that intends to reduce the period of interruption of a service which occurs when an OS is migrated from a physical machine to a virtual machine.

JP2009-145931, however, does not provide measures for preventing problems resulting from differences (or inconsistency) between devices (e.g., network cards and HDDs) available in a physical machine and a virtual machine. Generally, the same devices available in the physical machine are not always available in the virtual machine. If devices in the physical machine are different from devices in the virtual machine, it is highly likely that a process being executed using the devices in the physical machine before migration cannot be continued after the migration. That is, it is highly likely that processes for controlling the devices cannot be correctly performed after the migration.

SUMMARY

According to an aspect of this disclosure, there is provided a non-transitory computer-readable storage medium that stores program code for causing a computer to perform a method. The method includes steps of creating a redundant configuration including a physical device used by an operating system of the computer and a virtual device of a virtual machine running on another computer connected via a network to the computer, based on identification information of the virtual device; and transferring memory contents of the operating system to the other computer.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

BRIEF DESCRIPTION OF DRAWINGS

FIG. 8 is a table illustrating exemplary virtual device information stored in a virtual device information storing unit;

DESCRIPTION OF EMBODIMENTS

Figure 1:
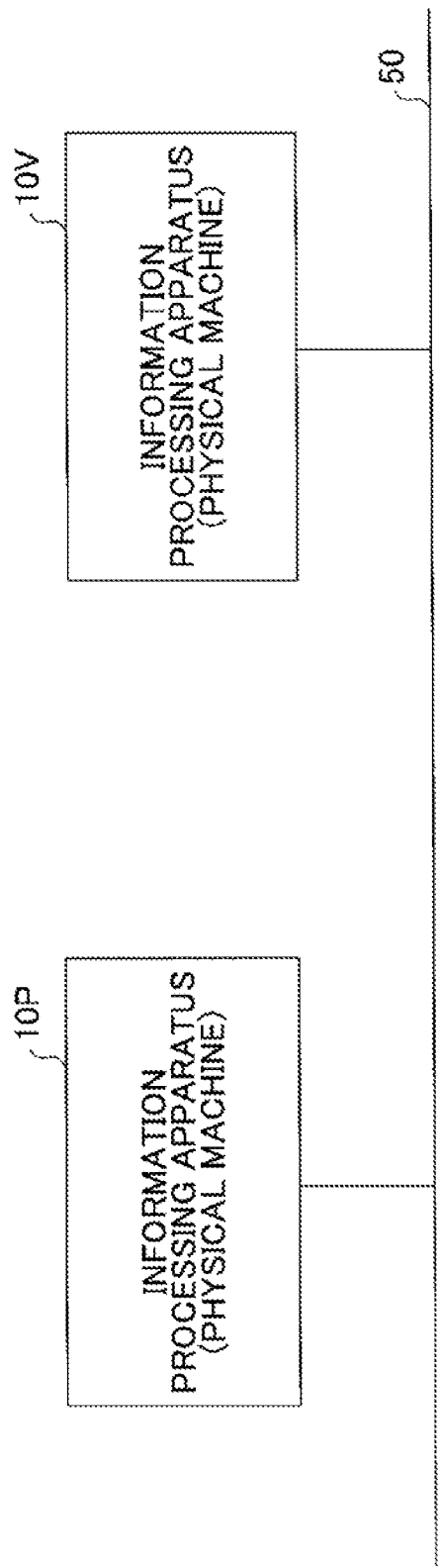
FIG. 1 is a drawing illustrating an exemplary configuration of a system according to an embodiment.

Preferred embodiments of the present invention are described below with reference to the accompanying drawings. FIG. 1 is a drawing illustrating an exemplary configuration of a system according to an embodiment. As illustrated in FIG. 1, the exemplary system includes an information processing apparatus 10P and an information processing apparatus 10V that are connected to each other via a network 50 such as a local area network (LAN). A part or the whole of the network 50 may be implemented by a wireless network.

The information processing apparatuses 10P and 10V may be implemented by general-purpose computers such as personal computers (PC). In this embodiment, it is assumed that an operating system (OS) is migrated from the information processing apparatus 10P to a virtual machine 23 running on the information processing apparatus 10V. The information processing apparatuses 10P and 10V may be collectively called the information processing apparatuses 10 when distinction is not necessary, and may also be called the information processing apparatus 10 (in the singular form) for descriptive purposes.

Figure 2:
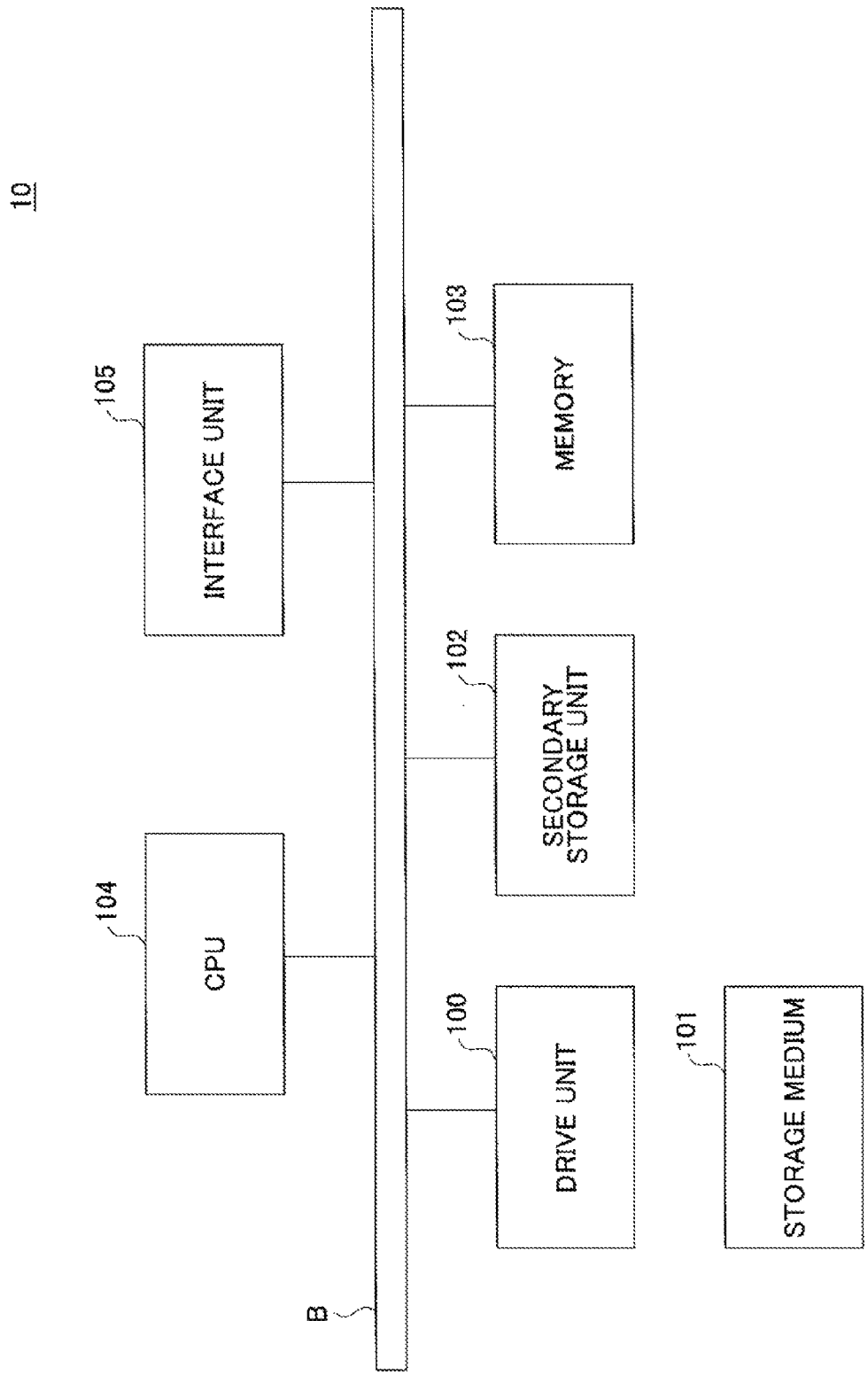
FIG. 2 is a block diagram illustrating an exemplary hardware configuration of an information processing apparatus according to an embodiment.

FIG. 2 is a block diagram illustrating an exemplary hardware configuration of the information processing apparatus 10 according to an embodiment. As illustrated in FIG. 2, the information processing apparatus 10 may include a drive unit 100, a secondary storage unit 102, a memory 103, a CPU 104, and an interface unit 105 that are connected to each other via a bus B.

Programs that cause the information processing apparatus 10 to perform various processes may be provided via a storage medium 101. When the storage medium 101 storing programs is mounted on the drive unit 100, the programs are read by the drive unit 100 from the storage medium 101 and are installed in the secondary storage unit 102. The programs may not necessarily be installed from the storage medium 101, but may instead be downloaded via a network from another information processing apparatus. The secondary storage unit 102 stores the installed programs and other necessary files and data.

The memory 103 temporarily stores programs read from the secondary storage unit 102 when the programs are executed. The CPU 104 executes functions of the information processing apparatus 10 according to the programs temporarily stored in the memory 103. The interface unit 105 connects the information processing apparatus 10 to a network.

In the descriptions below, "P" is attached to the reference numbers of hardware components (illustrated in FIG. 2) of the information processing apparatus 10P and "V" is attached to the reference numbers of hardware components (illustrated in FIG. 2) of the information processing apparatus 10V.

Examples of the storage medium 101 include portable storage media such as a compact disk read-only memory (CD-ROM), a digital versatile disk (DVD), and a universal serial bus (USB) memory. Examples of the secondary storage unit 102 include a hard disk drive (HDD) and a flash memory. The storage medium 101 and the secondary storage unit 102 are examples of information processing apparatus readable (or computer-readable) storage media.

A display unit such as a liquid crystal display and an input unit including, for example, a mouse and a keyboard may be connected to the information processing apparatus 10.

Figure 3:
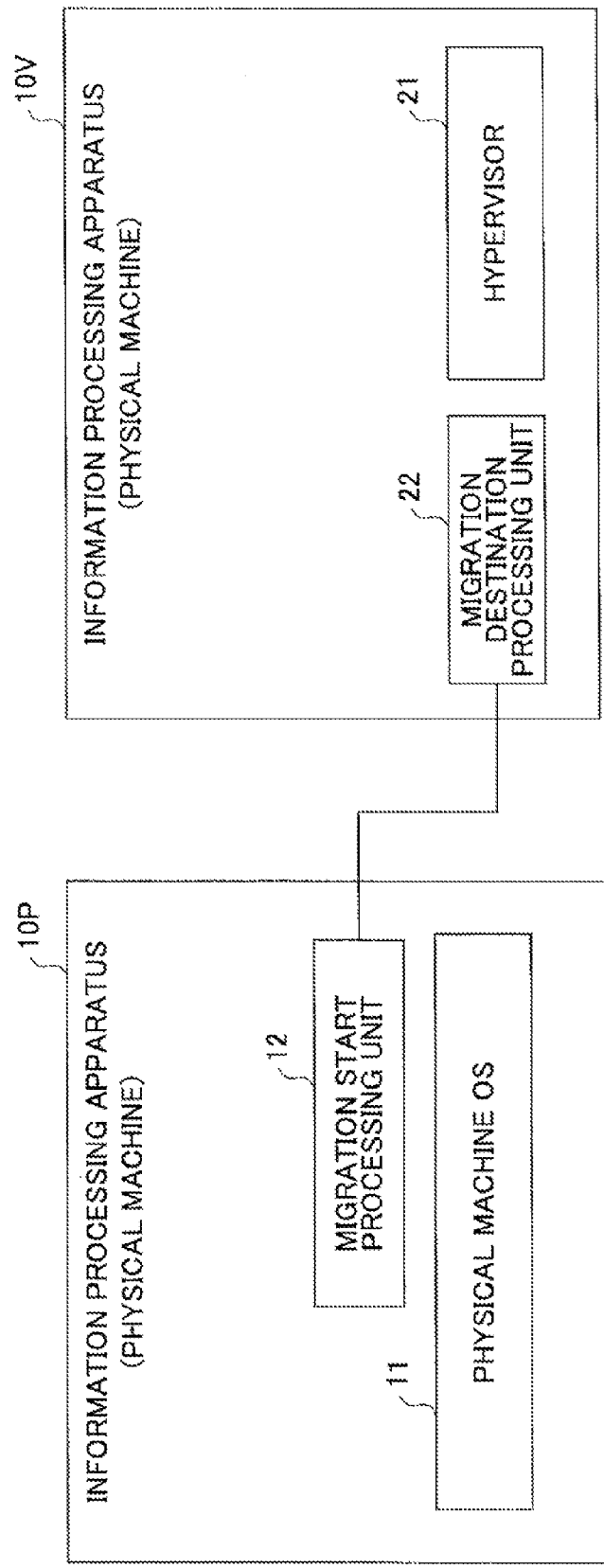
FIG. 3 is a block diagram illustrating an exemplary software configuration of an information processing apparatus according to an embodiment.

FIG. 3 is a drawing illustrating an exemplary software configuration of the information processing apparatus 10 according to an embodiment.

As illustrated in FIG. 3, the information processing apparatus 10P may include a physical machine OS 11 and a migration start processing unit 12. The physical machine OS 11 is a general-purpose operating system (OS). Here, an operating system running on the information processing apparatus 10P is called the physical machine OS 11 for distinction from an operating system (a virtual machine OS 24) that runs on the virtual machine 23 of the information processing apparatus 10V. The physical machine OS 11 runs directly on the information processing apparatus 10P (i.e., a physical machine) instead of on a virtual machine. In this embodiment, it is assumed that the physical machine OS 11 running on the information processing apparatus 10P is migrated to the virtual machine 23 of the information processing apparatus 10V.

Figure 4:
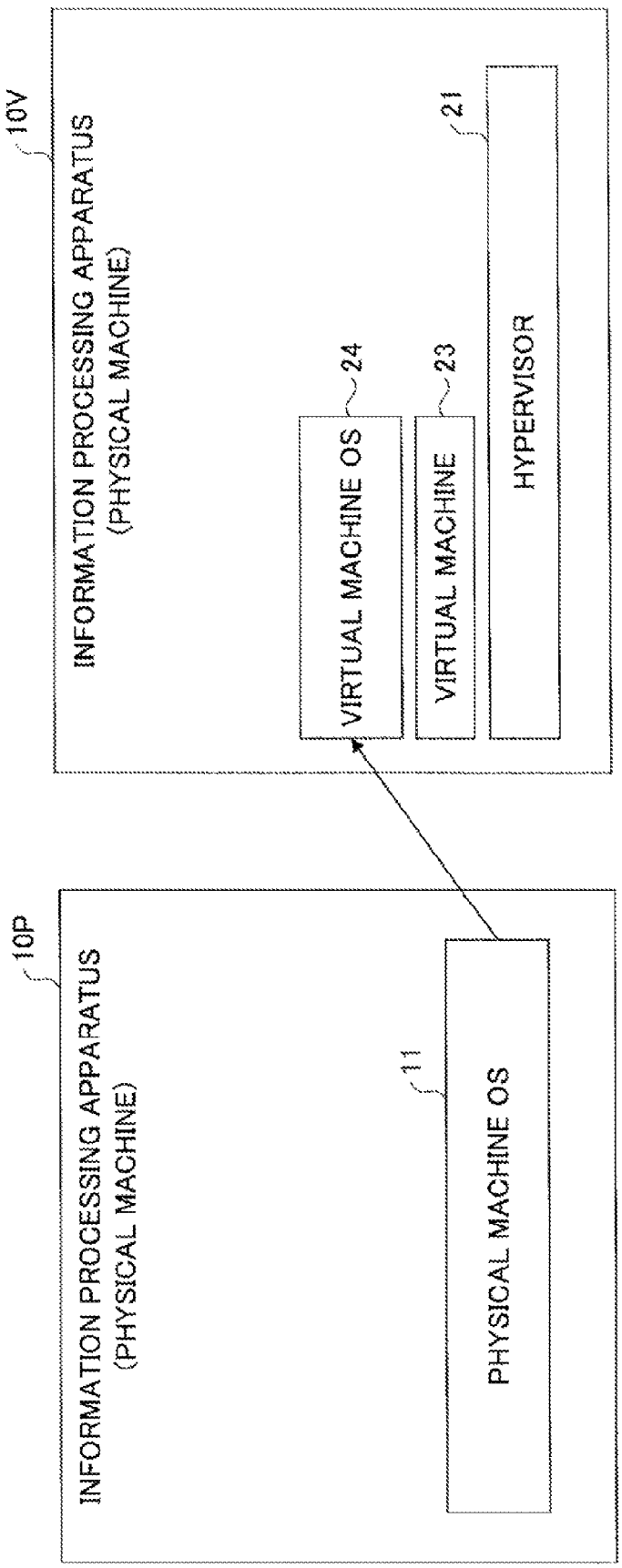
FIG. 4 is a drawing used to describe an exemplary process of migrating a physical machine OS according to an embodiment.

As illustrated in FIG. 4, the migration start processing unit 12 causes the CPU 104P to perform a process of migrating the physical machine OS 11 running on the information processing apparatus 10P to the virtual machine 23 running on the information processing apparatus 10V. For example, the migration start processing unit 12 transfers memory contents in a virtual address space being managed by the physical machine OS 11 (or where the physical machine OS 11 is loaded) and a disk image of the physical machine OS 11 to the information processing apparatus 10V. The disk image is a group of files or data that is generated in the secondary storage unit 102P when the physical machine OS 11 is installed in the information processing apparatus 10P and is loaded into the memory 103 (or the virtual address space) when the physical machine OS 11 is executed. After being migrated to the virtual machine 23, the physical machine OS 11 is called the virtual machine OS 24 for descriptive purposes.

The migration start processing unit 12 performs a process for preventing problems resulting from differences between devices being managed or used by the physical machine OS 11 (i.e., devices of the information processing apparatus 10P) and virtual devices available at the virtual machine 23. More specifically, the migration start processing unit 12 causes the physical machine OS 11 to create (or construct) redundant configurations composed of devices being managed by the physical machine OS 11 and virtual devices. Examples of the devices being managed by the physical machine OS 11 include a network interface card (NIC) and a hard disk drive (HDD). The NIC is an example of the interface unit 105P. The HDD is an example of the secondary storage unit 102P. Here, a redundant configuration indicates a configuration where two or more devices are treated as one virtual device. Examples of redundant configurations include bonding of NICs and a RAID (redundant array of independent disks) of HDDs.

The migration start processing unit 12 may be implemented as a program module (extension module) conforming to an extension point of the physical machine OS 11. Generally, an operating system has a mechanism or extension points, i.e., interfaces, that make it possible to load extension modules implementing extended functions as parts of the kernel and thereby enable dynamic function extension. Implementing the migration start processing unit 12 as a program module conforming to such an interface makes it possible to incorporate the function of the migration start processing unit 12 in the kernel of the physical machine OS 11 without altering, for example, the source code of the physical machine OS 11. This in turn makes it possible to ensure the versatility of this disclosure. In other words, implementing the migration start processing unit 12 as a program module (or extension module) makes it possible to apply this disclosure to a general-purpose OS available on the market. Still, however, the migration start processing unit 12 may be originally implemented as a part of the kernel of the physical machine OS 11. In either case, the migration start processing unit 12 needs to function as a part of the kernel of the physical machine OS 11 because only the kernel can read the memory contents of the physical machine OS 11.

The information processing apparatus 10V may include a hypervisor 21 and a migration destination processing unit 22. The hypervisor 21 is a program that causes the CPU 104V of the information processing apparatus 10V to implement the virtual machine 23. Generally, a hypervisor is also called a virtual machine monitor or a virtual machine (VM) manager. For example, the hypervisor 21 starts the virtual machine 23 based on a definition file of the virtual machine 23 and manages and monitors the operation of the virtual machine 23. The definition file of the virtual machine 23 includes the configuration information of the virtual machine 23.

The migration destination processing unit 22 performs a process for restoring the physical machine OS 11 on the virtual machine 23 implemented by the hypervisor 21. More specifically, the migration destination processing unit 22 restores the physical machine OS 11 with pre-migration operating conditions based on the memory contents and the disk image of the physical machine OS 11 transferred by the migration start processing unit 12. Restoring the physical machine OS 11 with pre-migration operating conditions makes it possible to ensure the continuity of a process of the physical machine OS 11 before and after the migration. That is, this embodiment enables live migration of the physical machine OS 11 from the physical machine (information processing apparatus) 10P to the virtual machine 23. The migration destination processing unit 22 may be implemented as a program that is separate from the hypervisor 21 or as a part of the hypervisor 21.

Figure 5:
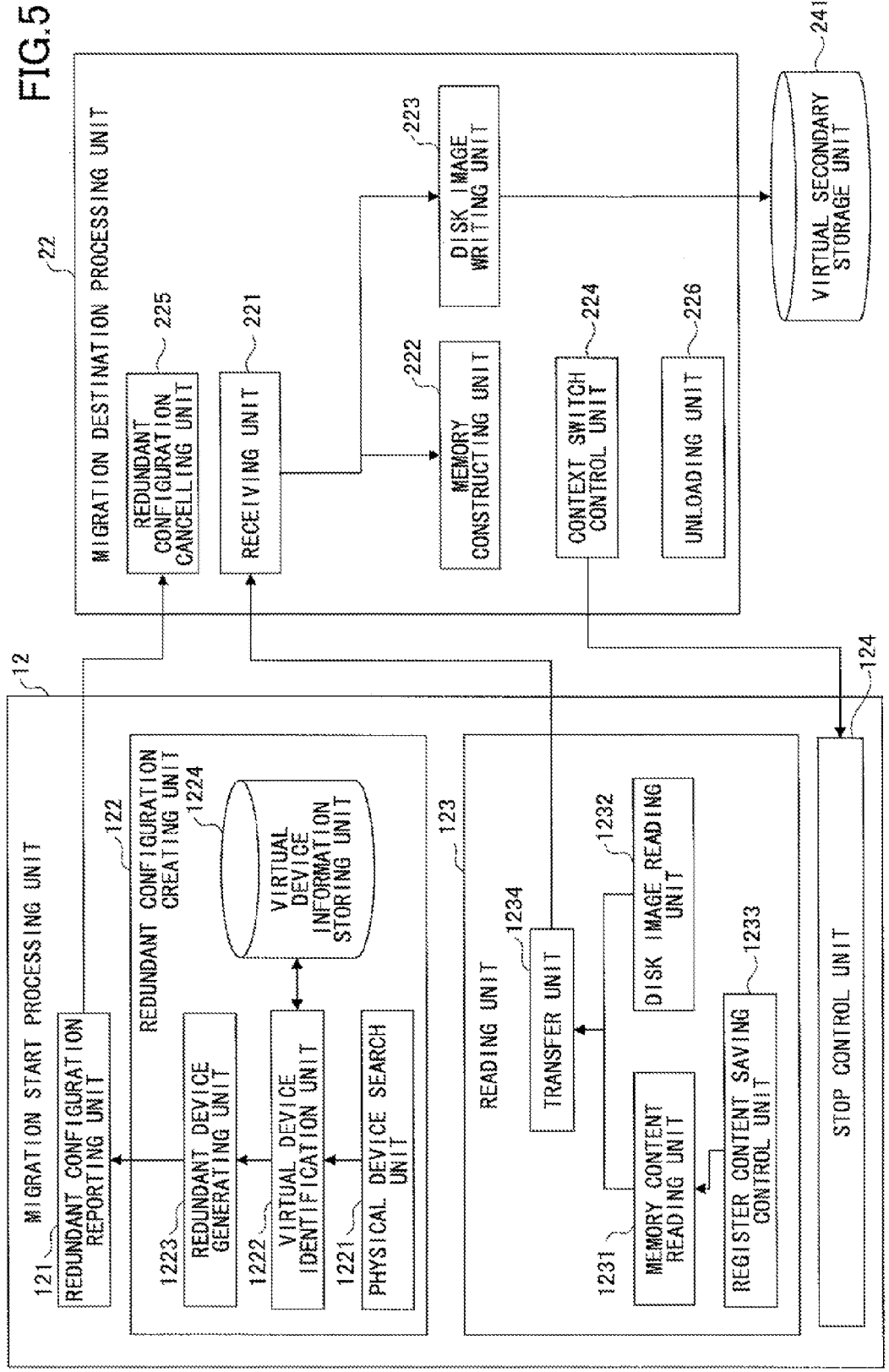
FIG. 5 is a block diagram illustrating exemplary configurations of a migration start processing unit and a migration destination processing unit.

FIG. 5 is a block diagram illustrating exemplary configurations of the migration start processing unit 12 and the migration destination processing unit 22. As illustrated in FIG. 5, the migration start processing unit 12 may include a redundant configuration reporting unit 121, a redundant configuration creating unit 122, a reading unit 123, and a stop control unit 124.

The redundant configuration creating unit 122 includes a physical device search unit 1221, a virtual device identification unit 1222, a redundant device generating unit 1223, and a virtual device information storing unit 1224. The physical device search unit 1221 searches for devices included in the information processing apparatus 10P. In other words, the physical device search unit 1221 generates a list of devices of the information processing apparatus 10P. Hereafter, devices of the information processing apparatus 10P may be called physical devices to distinguish them from virtual devices on the virtual machine 23.

The virtual device identification unit 1222 identifies virtual devices corresponding to the physical devices found by the physical device search unit 1221 based on virtual device information stored in the virtual device information storing unit 1224. In other words, the virtual device identification unit 1222 identifies virtual devices that can substitute for the physical devices on the virtual machine 23 to which the physical machine OS 11 has been migrated.

The virtual device information storing unit 1224 stores information (virtual device information) of respective virtual devices of the virtual machine 23. The virtual device information storing unit 1224 may be implemented, for example, by a storage area of the secondary storage unit 102P.

The redundant device generating unit 1223 causes the physical machine OS 11 to create redundant configurations composed of the physical devices found by the physical device search unit 1221 and the corresponding virtual devices.

The redundant configuration reporting unit 121 reports a list of identifiers of the created redundant configurations to the migration destination processing unit 22. The redundant configuration reporting unit 121 is an example of a reporting unit of the present application.

The reading unit 123 includes a memory content reading unit 1231, a disk image reading unit 1232, a register content saving control unit 1233, and a transfer unit 1234. The memory content reading unit 1231 reads (obtains) memory contents of the physical machine OS 11 that is in operation. The disk image reading unit 1232 reads (obtains) the disk image of the physical machine OS 11 from the secondary storage unit 102P. The register content saving control unit 1233 causes the physical machine OS 11 to save (copy) contents of registers (e.g., a program counter) of the CPU 104P of the information processing apparatus 10P in the memory space of the physical machine OS 11. The transfer unit 1234 transfers the memory contents read by the memory content reading unit 1231 and the disk image read by the disk image reading unit 1232 via the interface unit 105P to the migration destination processing unit 22 of the information processing apparatus 10V.

The stop control unit 124 controls a process for stopping the physical machine OS 11. Stopping the physical machine OS 11 is equivalent to turning off the power of the information processing apparatus 10P.

The migration destination processing unit 22 includes a receiving unit 221, a memory constructing unit 222, a disk image writing unit 223, a context switch control unit 224, a redundant configuration cancelling unit 225, and an unloading unit 226.

The receiving unit 221 receives, via the interface unit 105V, the memory contents and the disk image of the physical machine OS 11 transferred from the migration start processing unit 12. The memory constructing unit 222 writes the memory contents received by the receiving unit 221 into a memory space that is a virtual address space of the virtual machine OS 24 on the virtual machine 23. The disk image writing unit 223 writes the disk image received by the receiving unit 221 into a virtual secondary storage unit 241 of the virtual machine 23.

The context switch control unit 224 performs a process for switching process control of the physical machine OS 11 from the physical machine (the information processing apparatus 10P) to the virtual machine 23.

Exemplary processes performed by the information processing apparatus 10P and the information processing apparatus 10V are described below.

Figure 6:
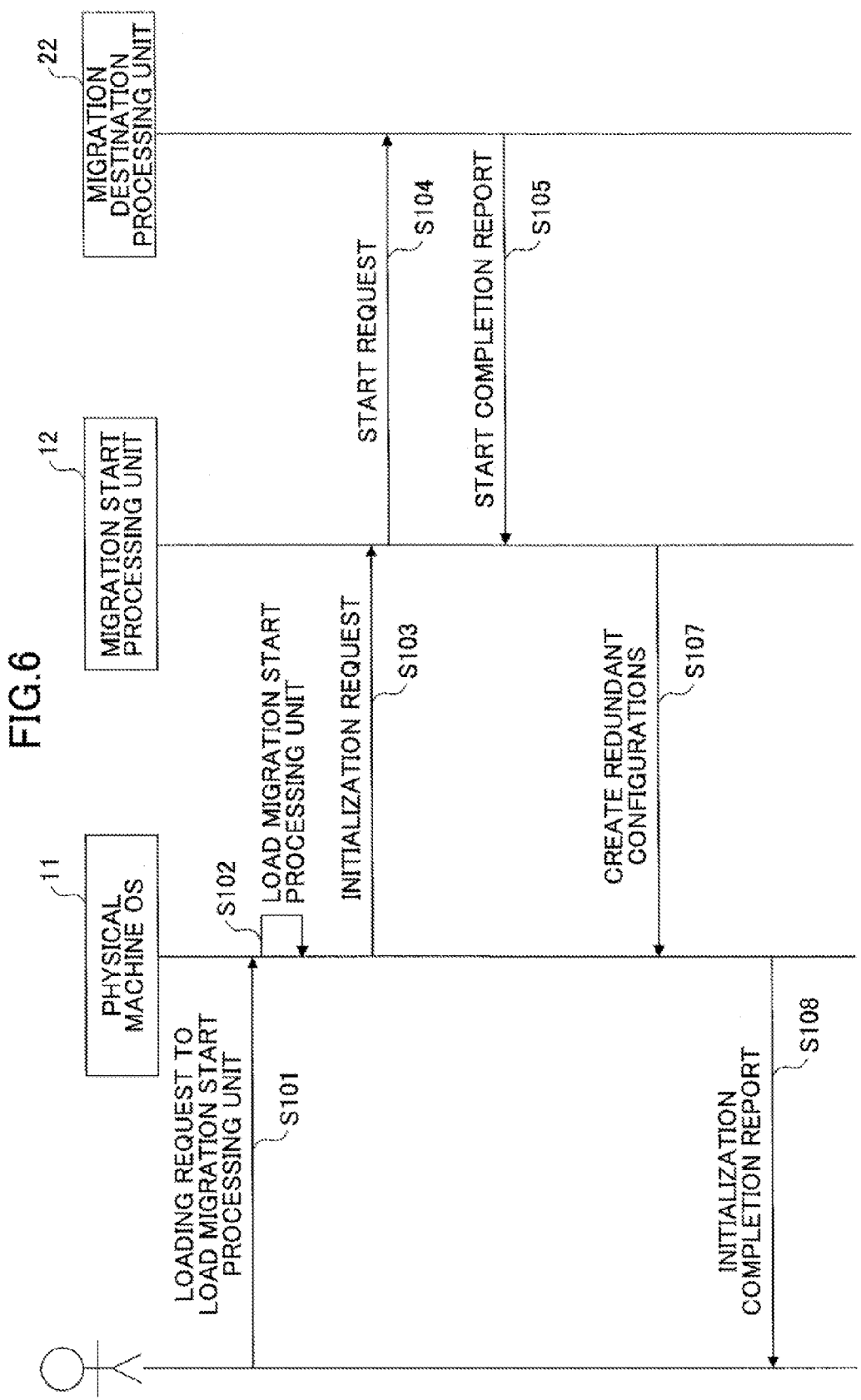
FIG. 6 is a sequence chart illustrating an exemplary initialization process for migration of a physical machine OS.

FIG. 6 is a sequence chart illustrating an exemplary initialization process for migration of the physical machine OS 11.

In step S101, the physical machine OS 11 receives, from the user, a loading request for requesting loading of the migration start processing unit 12 (strictly speaking, an extension module that causes the information processing apparatus 10P to function as the migration start processing unit 12). The loading request may be input, for example, via an input unit connected to the information processing apparatus 10P or an information processing apparatus connected via a network to the information processing apparatus 10P. The loading request may be represented by a command for the physical machine OS 11. For example, the file name of the extension module implementing the migration start processing unit 12 may be specified as an argument of the command.

In response, the kernel of the physical machine OS 11 loads the migration start processing unit 12 (S102). Next, the kernel of the physical machine OS 11 inputs an initialization request to the migration start processing unit 12 (S103). The initialization request is input to the migration start processing unit 12 via an interface (an entry point) of the migration start processing unit 12. For example, the migration start processing unit 12 may include definition information defining entry points of the migration start processing unit 12 and timing when the entry points are to be called. The definition information may be generated according to extension point interfaces of the physical machine OS 11. In step S103, the kernel of the physical machine OS 11 identifies an entry point to be called when the initialization process is performed and calls the identified entry point to input the initialization request to the migration start processing unit 12.

In response to the initialization request, the migration start processing unit 12 sends a start request for starting the migration destination processing unit 22 to the information processing apparatus 10V (S104). In response, the migration destination processing unit 22 is started at the information processing apparatus 10V. Then, the information processing apparatus 10V reports to the migration start processing unit 12 that the migration destination processing unit 22 has been started. Here, the identification information (e.g., an IP address) of the information processing apparatus 10V may be stored, for example, in the secondary storage unit 102P of the information processing apparatus 10P.

Next, the redundant configuration creating unit 122 of the migration start processing unit 12 creates redundant configurations composed of the physical devices of the information processing apparatus 10P and the corresponding virtual devices (S107). Details of step S107 (a process of creating redundant configurations) are described later. After the redundant configurations are created, the physical machine OS 11 displays information, which indicates the completion of the initialization process by the migration start processing unit 12, on a display unit of the information processing apparatus 10P or a display unit of another information processing apparatus connected via a network to the information processing apparatus 10P (S108).

Figure 7:
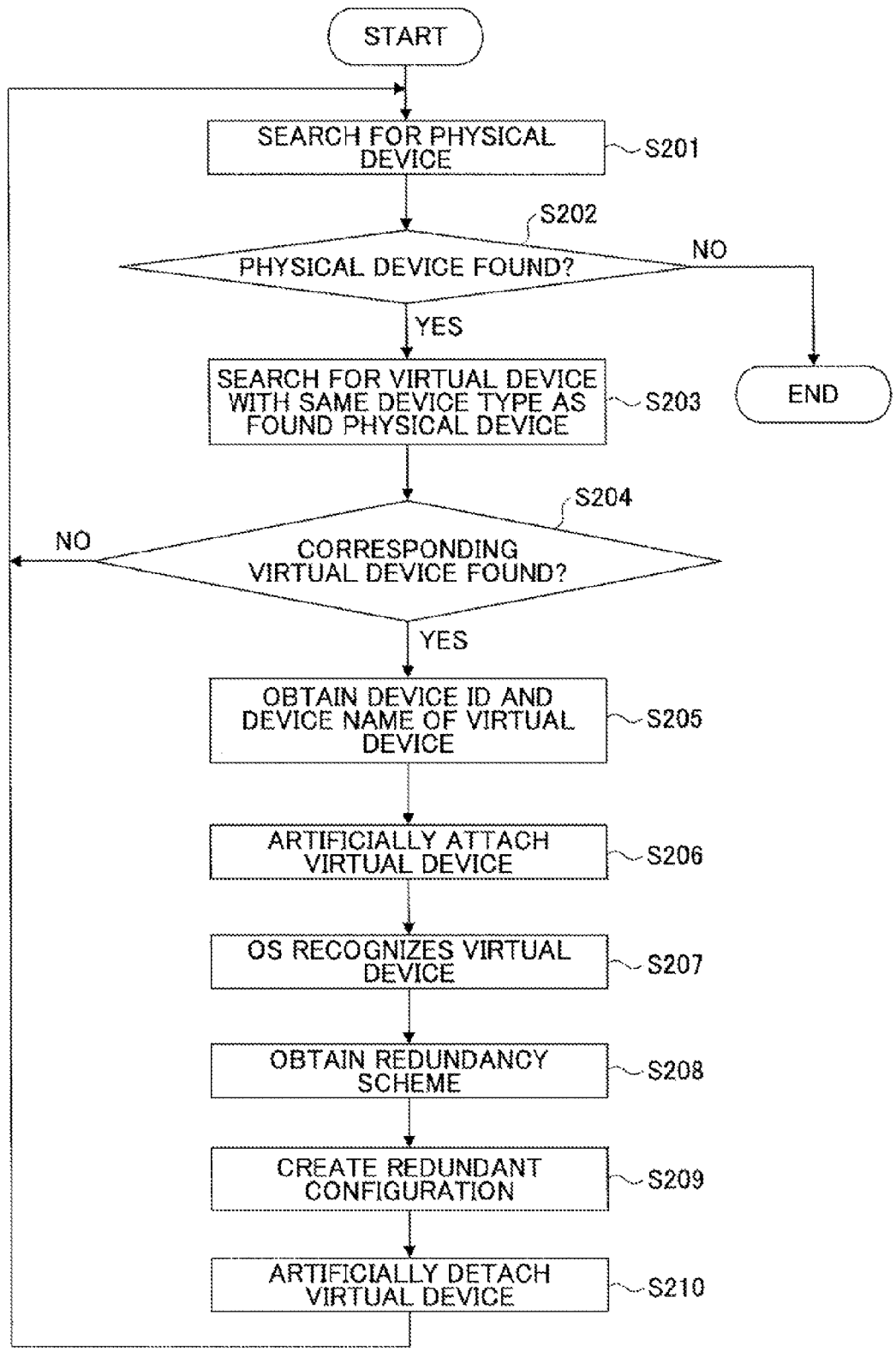
FIG. 7 is a flowchart illustrating an exemplary process of creating redundant configurations.

Details of step S107 are described below. FIG. 7 is a flowchart illustrating an exemplary process of creating redundant configurations.

In step S201, the physical device search unit 1221 of the migration start processing unit 12 searches for physical devices of the information processing apparatus 10P. The search result may include a device type, a device ID, and a device name of each physical device found by the search. The device type indicates the type of the physical device which is determined based on the function or use of the physical device. The device ID is the identifier of the physical device. The device name is the name of the physical device. Physical devices may be searched for by calling an application programming interface (API) provided by the physical machine OS 11.

When a physical device is found (YES in S202), the virtual device identification unit 1222 of the migration start processing unit 12 searches the virtual device information storing unit 1224 to find a virtual device with the same device type as that of the found physical device (hereafter called a current physical device) (S203).

FIG. 8 is a table illustrating exemplary virtual device information stored in the virtual device information storing unit 1224. As illustrated in FIG. 8, the virtual device information includes a device type, a device ID, a device name, and a redundancy scheme for each of virtual devices that are available for the virtual machine 23 (or included in the virtual machine 23) to which the physical machine OS 11 is to be migrated. The redundancy scheme indicates a technology or a method that is suitable to establish a redundant configuration of the corresponding virtual device (or of the physical device corresponding to the virtual device). The device type, the device ID, and the device name are examples of identification information of a virtual device.

The virtual device information storing unit 1224 may store the virtual device information as illustrated in FIG. 8 for virtual devices of the virtual machine 23 that are not equivalent to the physical devices of the information processing apparatus 10P. In other words, the virtual device information may include information on virtual devices of the virtual machine 23 corresponding to physical devices of the information processing apparatus 10V that may not be able to properly continue processes of physical devices of the information processing apparatus 10P after the physical machine OS 11 is migrated to the virtual machine 23.

When a virtual device with the same device type as that of the found physical device is found (YES in S204), the redundant device generating unit 1223 obtains the device ID and the device name of the found virtual device (hereafter called the corresponding virtual device) from the virtual device information storing unit 1224 (S205). Next, the redundant device generating unit 1223 "artificially" attaches a dummy of the corresponding virtual device (hereafter, may be called a dummy virtual device) to the information processing apparatus 10P using the obtained device ID and device name (S206). Here, "attaching" a device to the information processing apparatus 10P generally means physically connecting the device to the information processing apparatus 10P. For example, attaching a device having a USB connector means inserting the USB connector of the device into a USB port of the information processing apparatus 10P. Meanwhile, "artificially" attaching the dummy virtual device to the information processing apparatus 10P in step S206 does not mean physically (or actually) attaching the device to the information processing apparatus 10P. Instead, in step S206, the redundant device generating unit 1223 "deceives" the information processing apparatus 10P to believe that a device has been physically connected. Also in step S206, the "dummy" virtual device is attached to the information processing apparatus 10P because the corresponding virtual device is not actually present in the information processing apparatus 10P.

More specifically, the redundant device generating unit 1223 generates a (false) signal, which indicates that the corresponding virtual device has been connected, on the PCI bus of the information processing apparatus 10P. The CPU 104P of the information processing apparatus 10P receives the signal and outputs an inquiry signal to the PCI bus to acquire the device ID and the device name of the connected virtual device (i.e., the dummy virtual device). In response to the inquiry signal, the redundant device generating unit 1223 sends the device ID and the device name of the corresponding virtual device to the CPU 104P. Based on the device ID and the device name, the dummy virtual device is artificially attached to the information processing apparatus 10P.

When the corresponding virtual device (or the dummy virtual device) is artificially attached, the physical machine OS 11 recognizes the corresponding virtual device (S207). More specifically, the physical machine OS 11 installs a device driver for the attached corresponding virtual device using a plug-and-play mechanism. The installation result (or the installed device driver) is reflected in the memory contents and the disk image of the physical machine OS 11.

Next, the redundant device generating unit 1223 obtains a redundancy scheme associated with the corresponding virtual device from the virtual device information storing unit 1224 (S208). Storing redundancy schemes in association with virtual devices in the virtual device information storing unit 1224 makes it possible to provide flexibility and expandability for redundancy schemes used to create redundant configurations.

The redundant device generating unit 1223 causes the physical machine OS 11 to create a redundant configuration composed of the current physical device and the corresponding virtual device based on the device ID and the device name of the current physical device and the device ID and the device name of the corresponding virtual device (S209). The created redundant configuration is reflected in the memory contents and the disk image of the physical machine OS 11. In step S209, the redundant configuration is created according to the redundancy scheme obtained in step S208. Here, the redundant device generating unit 1223 assigns an identifier to each created redundant configuration and stores a list of identifiers of created redundant configurations in, for example, the memory 103P or the secondary storage unit 102P. The list of identifiers may be used to distinguish the redundant configurations created in relation to the migration of the physical machine OS 11 from redundant configurations created independently of the migration of the physical machine OS 11.

Then, the redundant device generating unit 1223 artificially detaches the corresponding virtual device (or the dummy virtual device) (S210). More specifically, the redundant device generating unit 1223 generates a signal indicating that the corresponding virtual device has been detached. Based on the signal, the physical machine OS 11 recognizes that the corresponding virtual device has been detached. "Detaching" a device generally means physically disconnecting the device. In step S210, however, since the corresponding virtual device has not been physically connected (or attached), the redundant device generating unit 1223 "artificially" detaches the corresponding virtual device. If the physical machine OS 11 is migrated to the virtual machine 23 without detaching the dummy virtual device, the "actual" corresponding virtual device may not be properly attached to the information processing apparatus 10V. More specifically, if the physical machine OS 11 is migrated to the virtual machine 23 without detaching the dummy virtual device, the device driver installed in step S207 is occupied by the dummy virtual device and the device driver cannot be used to control the "actual" corresponding virtual device on the virtual machine 23. For this reason, the redundant device generating unit 1223 artificially detaches the corresponding virtual device (or the dummy virtual device) in step S210.

Steps S203 through S210 are performed for each physical device of the information processing apparatus 10P found in step S201.

The process of FIG. 7 is further described with reference to FIGS. 9 and 10.

Figure 9:
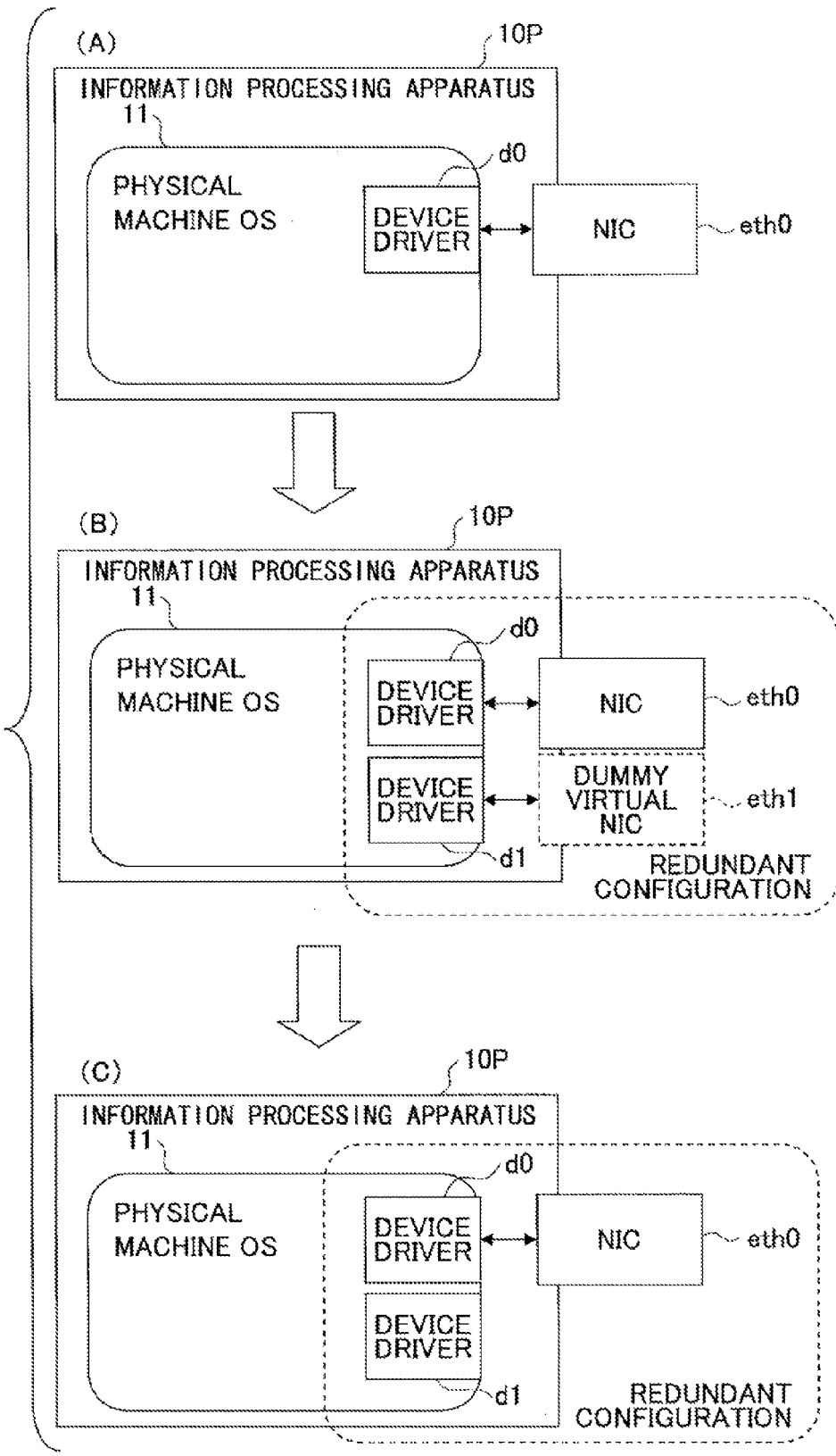
FIG. 9 is a drawing used to describe an exemplary process of creating a redundant configuration of NICs.

FIG. 9 is a drawing used to describe an exemplary process of creating a redundant configuration of NICs. FIG. 9(A) illustrates a state before the creation of a redundant configuration. In FIG. 9(A), an NIC (eth0), which is an example of the interface unit 105P, has been connected to the information processing apparatus 10P and a device driver d0 for the NIC (eth0) has been installed in the information processing apparatus 10P.

FIG. 9(B) illustrates a state after steps S206 through S209 of FIG. 7 are performed. In FIG. 9(B), a dummy virtual NIC (eth1) has been artificially attached to the information processing apparatus 10P and a device driver d1 for the dummy virtual NIC (eth1) has been installed in the information processing apparatus 10P. Also, in FIG. 9(B), a redundant configuration including the NIC (eth0) and the dummy virtual NIC (eth1) has been created by, for example, bonding. The dummy virtual NIC (eth1) is a dummy of the corresponding virtual device corresponding to the NIC (eth0). In the redundant configuration illustrated in FIG. 9(B), the NIC (eth0) corresponds to a primary (active) component and the dummy virtual NIC (eth1) corresponds to a secondary (standby) component on the physical machine OS 11. Both of the primary and secondary components may be in the active state or the secondary component may be in the standby state.

FIG. 9(C) illustrates a state after step S210 of FIG. 7 is performed. In FIG. 9(C), the dummy virtual NIC (eth1) has been detached, but the device driver d1 remains installed. In this state, the memory contents and the disk image of the physical machine OS 11 include information indicating that the device driver d1 has been installed. Also, the memory contents and the disk image of the physical machine OS 11 include information indicating that the redundant configuration including the NIC (eth0) and the dummy virtual NIC (eth1) has been created.

Figure 10:
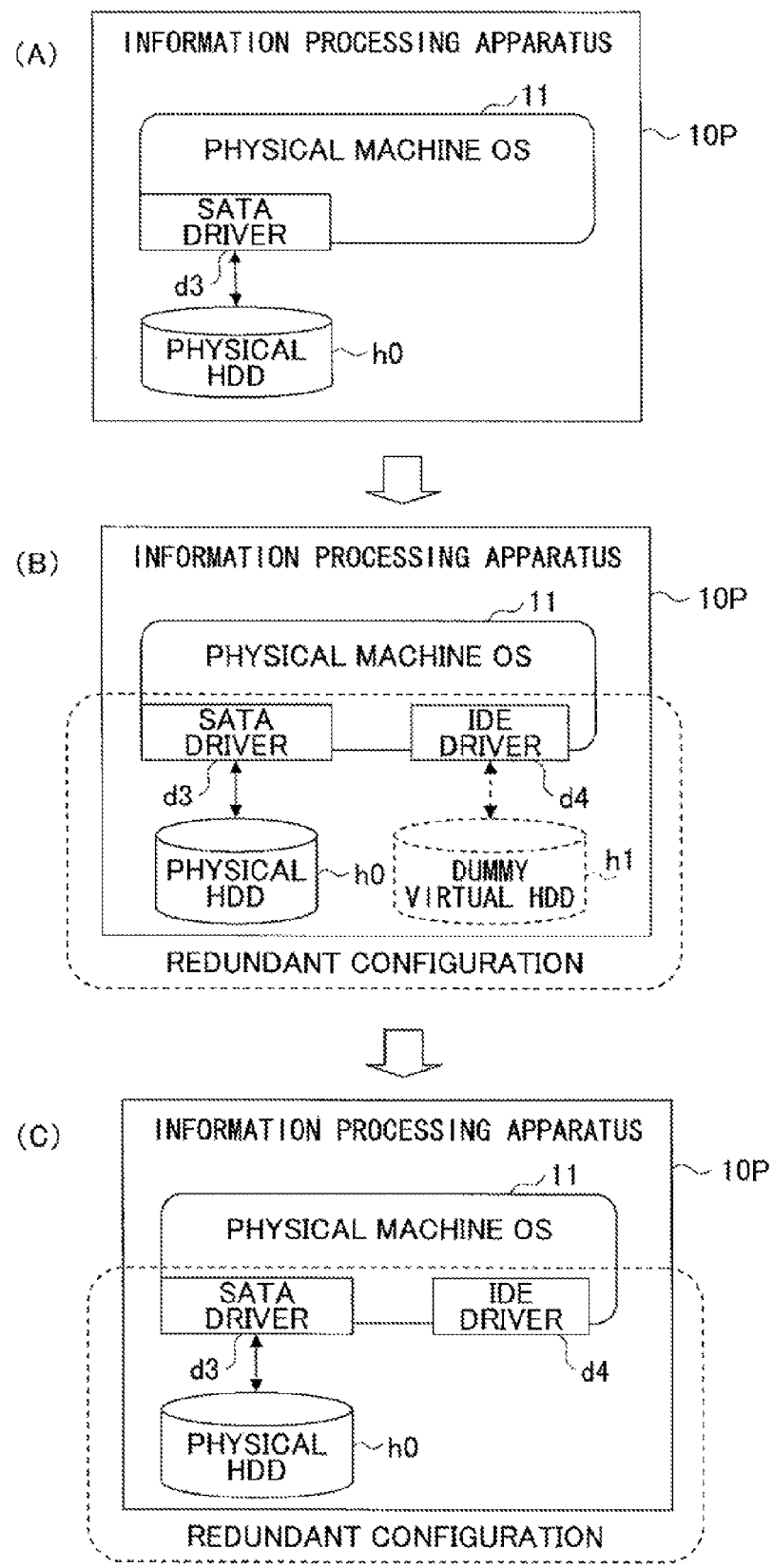
FIG. 10 is a drawing used to describe an exemplary process of creating a redundant configuration of HDDs.

FIG. 10 is a drawing used to describe an exemplary process of creating a redundant configuration of HDDs. FIG. 10(A) illustrates a state before the generation of a redundant configuration. In FIG. 10(A), an HDD (h0), which is an example of the secondary storage unit 102P, has been connected to the information processing apparatus 10P and a Serial Advanced Technology Attachment (SATA) driver d3 for the HDD (h0) has been installed in the information processing apparatus 10P.

FIG. 10(B) illustrates a state after steps S206 through S209 of FIG. 7 are performed. In FIG. 10(B), a dummy virtual HDD (h1) has been artificially attached to the information processing apparatus 10P and an Integrated Drive Electronics (IDE) driver d4 for the dummy virtual HDD (h1) has been installed in the information processing apparatus 10P. Also in FIG. 10(B), a redundant configuration including the HDD (h0) and the dummy virtual HDD (h1) has been generated according to, for example, RAID 1 (mirroring). The dummy virtual HDD (h1) is a dummy of the corresponding virtual device corresponding to the HDD (h0). In the redundant configuration illustrated in FIG. 10(B), the HDD (h0) corresponds to a primary (active) component and the dummy virtual HDD (h1) corresponds to a secondary (standby) component on the physical machine OS 11. Both of the primary and secondary components may be in the active state or the secondary component may be in the standby state.

FIG. 10(C) illustrates a state after step S210 of FIG. 7 is performed. In FIG. 10(C), the dummy virtual HDD (h1) has been detached, but the IDE driver d4 remains installed. In this state, the memory contents and the disk image of the physical machine OS 11 include information indicating that the IDE driver d4 has been installed. Also, the memory contents and the disk image of the physical machine OS 11 include information indicating that the redundant configuration including the HDD (h0) and the dummy virtual HDD (h1) has been created.

Next, an exemplary process of migrating the physical machine OS 11 which is performed after the process of FIG. 6 is described.

Figure 11:
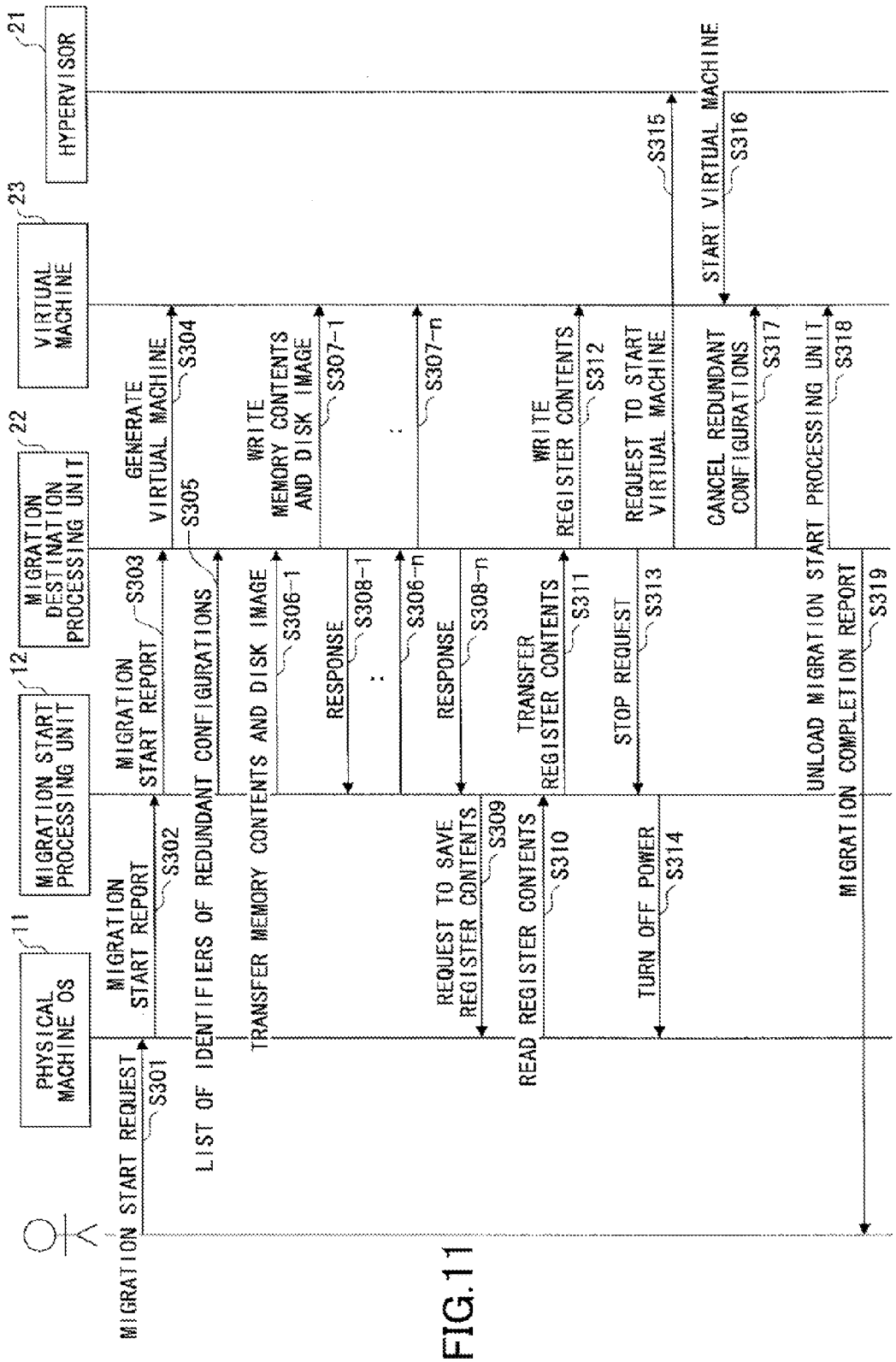
FIG. 11 is a sequence chart illustrating an exemplary process of migrating a physical machine OS from a physical machine to a virtual machine.

FIG. 11 is a sequence chart illustrating an exemplary process of migrating the physical machine OS 11 from the physical machine (the information processing apparatus 10P) to the virtual machine 23.

In step S301, the physical machine OS 11 receives a migration start request. The migration start request may be input, for example, by generating a signal corresponding to a migration start entry point of the migration start processing unit 12. For example, a command for generating such a signal may be provided. In this case, the user calls the command to input the migration start request.

In response to the migration start request, the physical machine OS 11 reports the start of migration to the migration start processing unit 12 (S302). In response to the report, the migration start processing unit 12 reports the start of migration to the migration destination processing unit 22 running on the information processing apparatus 10V (S303). In response to the report, the migration destination processing unit 22 generates an empty virtual machine 23 in a memory space of the information processing apparatus 10V (S304).

Next, the redundant configuration reporting unit 121 of the migration start processing unit 12 transfers (or sends) the list of identifiers of redundant configurations, which has been stored by the redundant device generating unit 1223 in the memory 103P or the secondary storage unit 102P, to the redundant configuration cancelling unit 225 of the migration destination processing unit 22 (S305). The redundant configuration cancelling unit 225 receives the list of identifiers of redundant configurations and stores the received list of identifiers in, for example, the memory 103V or the secondary storage unit 102V.

The memory content reading unit 1231 of the migration start processing unit 12 reads the memory contents of the physical machine OS 11 in units of pages. Also, the disk image reading unit 1232 of the migration start processing unit 12 reads the disk image of the physical machine OS 11 from the secondary storage unit 102P. Then, the transfer unit 1234 of the migration start processing unit 12 transfers the memory contents read in units of pages and the disk image to the migration destination processing unit 22 (S306-1 through S306-n). For example, the transfer unit 1234 transfers the memory contents and the disk image in multiple batches.

The memory contents and the disk image sent from the transfer unit 1234 are received by the receiving unit 221 of the migration destination processing unit 22. Each time when a batch (or page) of the memory contents is received by the receiving unit 221, the memory constructing unit 222 writes the batch of the memory contents into a virtual memory space assigned to the virtual machine OS 24 on the virtual machine 23; and each time when a batch of the disk image is received by the receiving unit 221, the disk image writing unit 223 writes the batch of the disk image into the virtual secondary storage unit 241 of the virtual machine 23 (S307-1 through S307-n). Each time when the writing of the memory contents or the disk image is completed, the receiving unit 221 sends a response indicating the result of writing (successful or not) to the transfer unit 1234 of the migration start processing unit 12 (S308-1 through S308-n).

The memory constructing unit 222 also writes the virtual addresses and the physical addresses of the pages of the written memory contents in a page table of the virtual machine 23. The values of the physical addresses may be determined based on the results of writing the memory contents.

Figure 12:
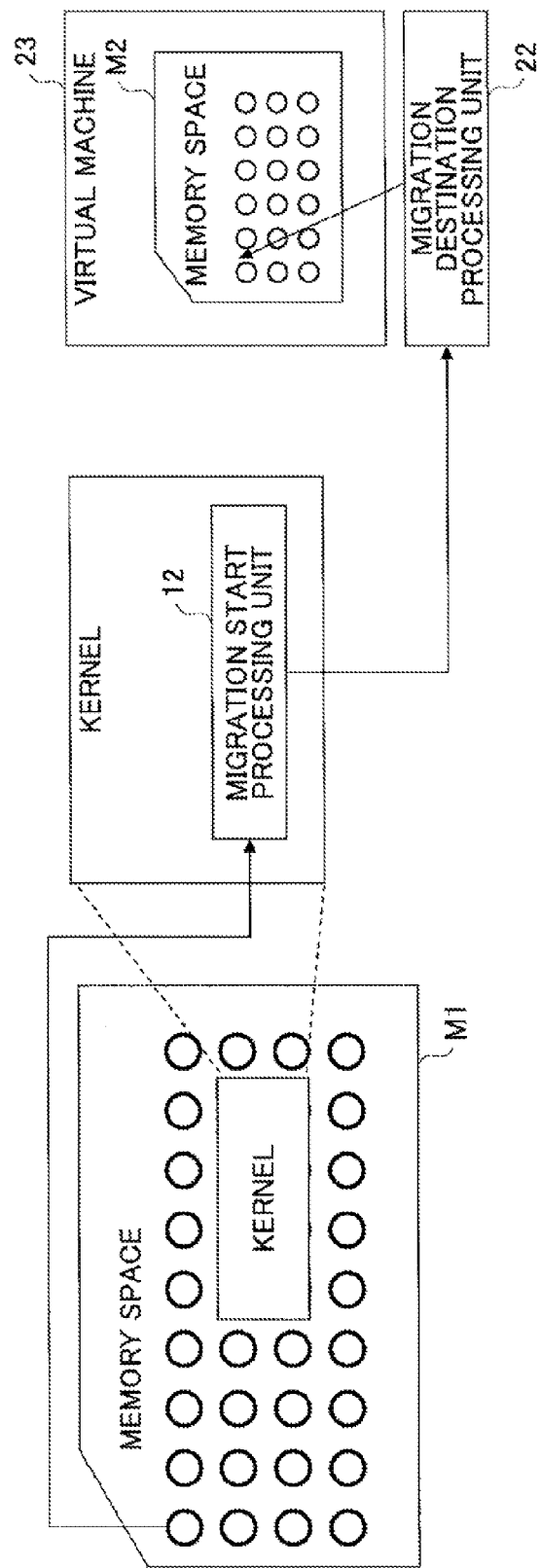
FIG. 12 is a drawing used to describe an exemplary process of transferring memory contents of a physical machine OS.

FIG. 12 is a drawing used to describe an exemplary process of transferring the memory contents of the physical machine OS 11. As illustrated in FIG. 12, the contents of a memory space M1 (memory contents) of the physical machine OS 11 are read by the migration start processing unit 12 and transferred to the migration destination processing unit 22. The migration destination processing unit 22 receives the memory contents and writes the received memory contents into a memory space M2 of the virtual machine 23. As a result, the contents of the memory space M1 of the physical machine OS 11 are restored in the memory space M2 of the virtual machine 23. Here, the memory space M1 contains the kernel where the migration start processing unit 12 is loaded. The kernel with the migration start processing unit 12 loaded is also restored in the memory space M2 of the virtual machine 23.

Details of the process of transferring memory contents may be determined, for example, based on a memory content transfer process in a live migration technology for a virtual machine. For example, regions rewritten during a transfer process may be flagged and retransferred.

The memory contents may not necessarily be transferred in units of pages. For example, multiple pages of the memory contents may be transferred at once, or each page may be divided into a predetermined number of parts and one part may be transferred each time. As long as the receiving end (the migration destination processing unit 22) can identify the boundary between pages and can generate a page table, the memory contents may be transferred in any other units.

Figure 13:
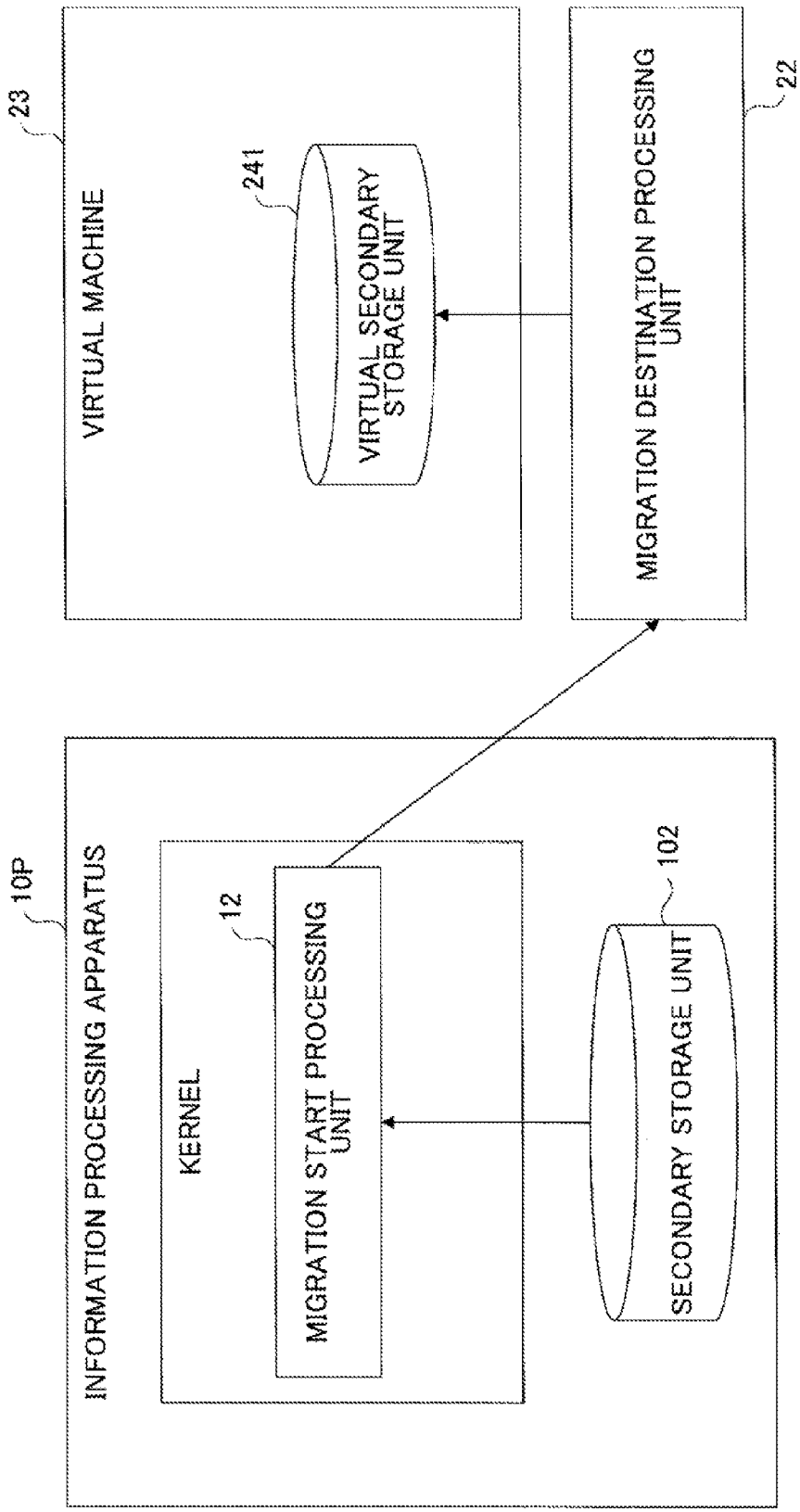
FIG. 13 is a drawing used to describe an exemplary process of transferring a disk image of a physical machine OS.

FIG. 13 is a drawing used to describe an exemplary process of transferring the disk image of the physical machine OS 11. As illustrated in FIG. 13, the disk image of the physical machine OS 11 stored in the secondary storage unit 102P is read by the migration start processing unit 12 and transferred to the migration destination processing unit 22. The migration destination processing unit 22 receives the disk image and writes the received disk image into the virtual secondary storage unit 241 of the virtual machine 23. As a result, the disk image of the physical machine OS 11 is restored in the virtual secondary storage unit 241 of the virtual machine 23. Here, the disk image of the physical machine OS 11 can also be read by a program other than the kernel. Therefore, the disk image may be read and transferred by a program that is separate from the kernel (e.g., a program that runs as a process on the physical machine OS 11).

Transfer of the memory contents of the physical machine OS 11 and transfer of the disk image of the physical machine OS 11 may be performed in parallel or in series.

Figure 14:
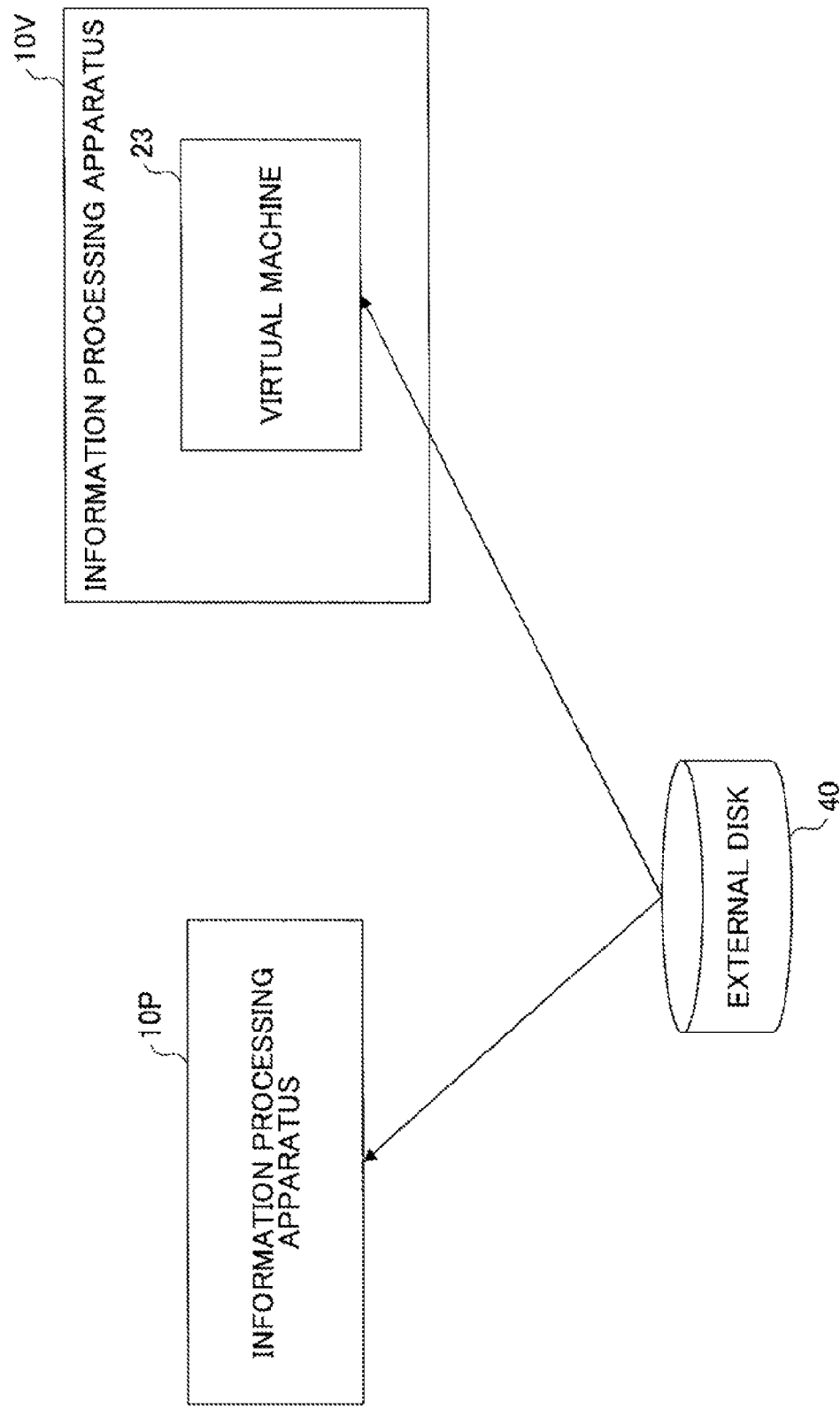
FIG. 14 is a drawing used to describe a case where a physical machine OS is booted from an external disk.

FIG. 14 illustrates a case where the physical machine OS 11 of the information processing apparatus 10P is booted from an external disk 40 using a technology such as a SAN (storage area network) boot or an iSCSI (Internet Small Computer System Interface) boot. In this case, transfer of the disk image is not necessary. The external disk 40 is a storage device (e.g., an HDD) that is connected via a network to the information processing apparatus 10P.

In FIG. 14, an arrow from the external disk 40 to the information processing apparatus 10P indicates that an IP address of the external disk 40 is set in the information processing apparatus 10P, and the physical machine OS 11 is loaded from the external disk 40 into the information processing apparatus 10P. In this case, when migrating the physical machine OS 11, the IP address of the external disk 40 from which the virtual machine OS 24 is to be loaded may be set in the virtual machine 23. For this purpose, for example, the disk image reading unit 1232 obtains the IP address of the external disk 40 from the physical machine OS 11 in parallel with, or before or after the transfer of the memory contents. The transfer unit 1234 transfers the IP address to the migration destination processing unit 22. When the IP address is received by the receiving unit 221 of the migration destination processing unit 22, the disk image writing unit 223 writes the IP address, in a definition file of the virtual machine 23, as information indicating the source from which the virtual machine OS 24 is to be loaded.

When started by the hypervisor 21, the virtual machine 23 can determine, based on the IP address in the definition file, that the virtual machine OS 24 is loaded from the external disk 40.

When transfer of all the memory contents and the entire disk image is completed (S307-n) and responses to the transfer are received (S308-n), the register content saving control unit 1233 of the migration destination processing unit 12 requests the physical machine OS 11 to save register contents (S309). The physical machine OS 11 saves (or copies) the contents of registers (such as a program counter) of the CPU 104P in the memory space of the physical machine OS 11. Next, the memory content reading unit 1231 reads the saved contents of registers (register contents) from the memory space of the physical machine OS 11 (S310). Then, the transfer unit 1234 transfers the read register contents to the migration destination processing unit 22 (S311). When the register contents are received by the receiving unit 221 of the migration destination processing unit 22, the memory constructing unit 222 writes the received register contents in a predetermined region of the memory space of the virtual machine 23 (S312).

Next, the context switch control unit 224 of the migration destination processing unit 22 sends a stop request for stopping the physical machine OS 11 to the migration start processing unit 12 (S313). In response to the stop request, the stop control unit 124 of the migration start processing unit 12 turns off the power of the information processing apparatus 10P and thereby stops (shuts down) the physical machine OS 11 (S314).

Next, the context switch control unit 224 requests the hypervisor 21 to start the virtual machine 23 (S315). In response to the request, the hypervisor 21 starts the virtual machine 23 (S316). More specifically, the hypervisor reads the register contents written in the memory space of the virtual machine 23 and sets the register contents in the CPU of the virtual machine 23. For example, the value of the program counter is set in the CPU. As a result, the physical machine OS 11 migrated to the virtual machine 23 (i.e., the virtual machine OS 24) resumes a process from the address indicated by the program counter. This configuration eliminates the need to restart the physical machine OS 11 and enables the physical machine OS 11 to continue a process as the virtual machine OS 24 on the virtual machine 23.

After the virtual machine 23 is started, the primary (active) components in the redundant configurations become unable to operate normally because the primary components that are available (or valid) in the information processing apparatus 10P are not available in the virtual machine 23. Therefore, due to the mechanism of the redundant configurations, the process control automatically moves from the primary components to the secondary (standby) components. Since the secondary components correspond to virtual devices available in the virtual machine 23, the corresponding virtual devices are attached when the virtual machine 23 is started. In this case, since the virtual machine 23 includes the corresponding virtual devices, "actual" virtual devices, instead of dummy virtual devices, are attached. When the process control moves to the secondary components, the secondary components can continue, without interruption, a process being performed by the primary components before the migration. This configuration makes it possible to prevent problems resulting from differences (or inconsistency) between devices available before and after migration and thereby makes it possible to seamlessly continue a process being performed by the devices. For example, the same IP address can be used for NICs before and after migration. Therefore, an information processing apparatus communicating with the information processing apparatus 10P using an IP address before the migration of the physical machine OS 11 can communicate with the information processing apparatus 10V using the same IP address even after the physical machine OS 11 is migrated to the virtual machine 23.

Next, the redundant configuration cancelling unit 225 of the migration destination processing unit 22 causes the virtual machine OS 24 to cancel the redundant configurations of virtual devices on the virtual machine 23 (S317). The redundant configurations to be cancelled are determined based on the list of identifiers of redundant configurations stored in the memory 103V or the secondary storage unit 102V in step S305. This makes it possible to cancel only the redundant configurations created for the migration of the physical machine OS 11 and to prevent other redundant configurations created independently of the migration from being cancelled.

After cancelling the redundant configurations, the redundant configuration cancelling unit 225 uninstalls the device drivers of the primary components from the information processing apparatus 10V since they are not necessary in the virtual machine 23. Even if the device drivers are not uninstalled, there is a little chance of the device drivers causing a problem in execution of a process on the virtual machine 23. The device drivers to be uninstalled can be identified by querying the virtual machine OS 24 based on the list of identifiers of redundant configurations stored in the memory 103V or the secondary storage unit 102V in step S305.

Figure 15:
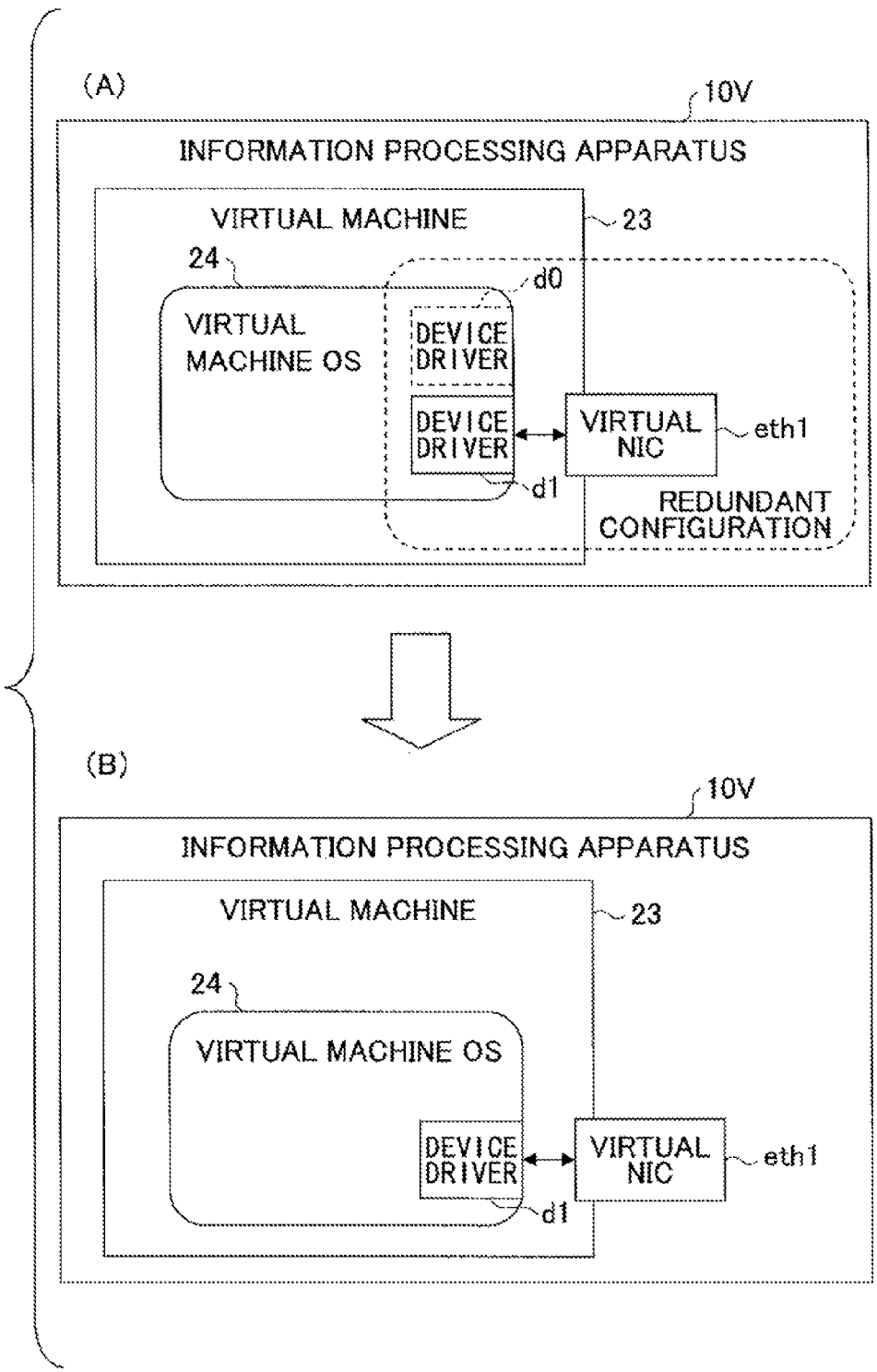
FIG. 15 is a drawing used to describe an exemplary process of cancelling a redundant configuration of NICs.

FIG. 15 is a drawing used to describe an exemplary process of cancelling a redundant configuration of NICs. FIG. 15(A) illustrates a state where a redundant configuration (bonding) of NICs is still present after the virtual machine 23 is started. In FIG. 15(A), the virtual NIC (eth1) is attached to the device driver d1. Also in FIG. 15(A), the process control has been moved from the device driver d0, which does not operate normally on the virtual machine 23, to the device driver d1 for the secondary (standby) component. The device driver d0 is illustrated by a dotted line to indicate that it does not operate normally on the virtual machine 23.

FIG. 15(B) illustrates a state after step S317 of FIG. 11 is performed. In FIG. 15(B), the redundant configuration has been cancelled and the device driver d0 has been uninstalled. Since the process control has been moved to the device driver d1 and the virtual NIC (eth1), which is the secondary (standby) component, a process (i.e., a communication process) can be properly performed by the device driver d1 and the virtual NIC (eth1) even if the device driver d0 is uninstalled.

Figure 16:
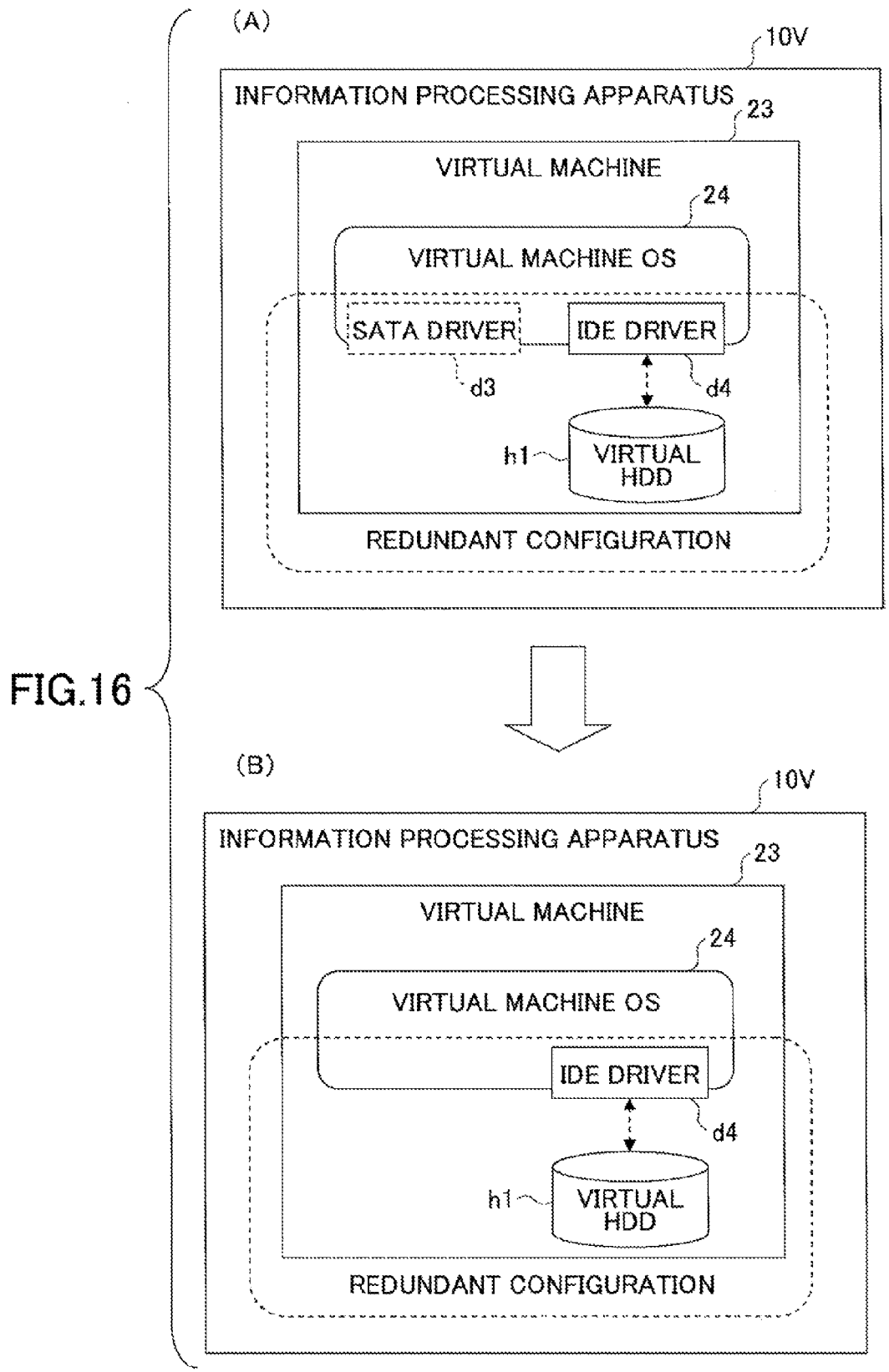
FIG. 16 is a drawing used to describe an exemplary process of cancelling a redundant configuration of HDDs.

FIG. 16 is a drawing used to describe an exemplary process of cancelling a redundant configuration of HDDs. FIG. 16(A) illustrates a state where a redundant configuration (RAID 1) of HDDs is still present after the virtual machine 23 is started. In FIG. 16(A), the virtual HDD (h1) is attached to the IDE driver d4. Also in FIG. 16(A), the process control has been moved from the SATA driver d3, which does not operate normally on the virtual machine 23, to the IDE driver d4 for the secondary (standby) component. The SATA driver d3 is illustrated by a dotted line to indicate that it does not operate normally on the virtual machine 23.

FIG. 16(B) illustrates a state after step S317 of FIG. 11 is performed. In FIG. 16(B), the redundant configuration has been cancelled and the SATA driver d3 has been uninstalled. Since the process control has been moved to the IDE driver d4 and the virtual HDD (h1), which is the secondary (standby) component, a process (i.e., a storing process) can be properly performed by the IDE driver d4 and the virtual HDD (h1) even if the SATA driver d3 is uninstalled.

Referring back to FIG. 11, the unloading unit 226 of the migration destination processing unit 22 causes the virtual machine OS 24 to unload the migration start processing unit 12 from the kernel of the virtual machine OS 24 (S318). The virtual machine OS 24 is the physical machine OS 11 migrated to the virtual machine 23 together with its operating conditions. Therefore, the migration start processing unit 12 loaded into the kernel of the physical machine OS 11 is also present in the kernel of the virtual machine OS 24. In step S318, the migration start processing unit 12 remaining in the kernel is unloaded.

Then, the migration destination processing unit 22 displays, for example, a message indicating the completion of the migration process on a display unit of the information processing apparatus 10V or a display unit of another information processing apparatus connected via a network to the information processing apparatus 10V (S319). The message is displayed to report the completion of the migration process to the user.

According to the above embodiment, a redundant configuration, which includes a device of the information processing apparatus 10P (physical machine) and a device of the virtual machine 23 to which the physical machine OS 11 is to be migrated, is generated on the information processing apparatus 10P. This configuration makes it possible to prevent an error in a device control process which may result from differences (or inconsistency) between devices available in the physical machine and the virtual machine.

In the above embodiment, in addition to the disk image of the physical machine OS 11, the memory contents of the physical machine OS 11 are transferred to the information processing apparatus 10V. This makes it possible to migrate the physical machine OS 11 to the virtual machine 23 while maintaining the operational conditions of the physical machine OS 11. In other words, the above embodiment makes it possible to migrate the physical machine OS 11 from the information processing apparatus 10P to the virtual machine 23 without restarting the physical machine OS 11.

Also, implementing the migration start processing unit 12 as an extension module makes it possible to apply this disclosure to a general-purpose OS.

An aspect of this disclosure provides a non-transitory computer-readable storage medium storing a migration program, an information processing apparatus, and a migration method that make it possible to prevent problems that may occur when migrating an operating system from a physical machine to a virtual machine due to differences (or inconsistency) between devices available in the physical machine and the virtual machine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing program code for causing a computer to perform a method, the method comprising:
creating a redundant configuration including a physical device as a primary device and a virtual device corresponding to the physical device as a secondary device by attaching a dummy of the virtual device to the computer based on identification information of the virtual device, the physical device being used by an operating system of the computer and the virtual device being available in a virtual machine running on another computer connected via a network to the computer;
installing a device driver corresponding to the virtual device in the operating system;
detaching the dummy of the virtual device; and
after the dummy of the virtual device is detached, transferring memory contents and a disk image of the operating system including the device driver corresponding to the virtual device and a device driver corresponding to the physical device, to the other computer to migrate the operating system to the other computer,
wherein in the other computer to which the operating system has been migrated, a process control is moved from the device driver of the physical device to the device driver of the virtual device, and the device driver of the physical device is uninstalled.

2. The storage medium as claimed in claim 1, the method further comprising:
obtaining a redundancy scheme based on the identification information of the virtual device from a storage unit storing the redundancy scheme in association with the identification information of the virtual device,
wherein the redundant configuration is created based on the obtained redundancy scheme.

3. The storage medium as claimed in claim 1, the method further comprising:
reporting an identifier of the created redundant configuration to the other computer.

4. The storage medium as claimed in claim 1, the method further comprising:
searching for the virtual device corresponding to the physical device based on a device type of the physical device.

5. The storage medium as claimed in claim 1, the method further comprising:
transferring contents of a register of a CPU of the computer to the other computer.

6. An information processing apparatus, comprising:
a memory configured to store a program; and
a processor configured to execute the program and thereby implement
a redundant configuration creating unit configured to
create a redundant configuration including a physical device as a primary device and a virtual device corresponding to the physical device as a secondary device by attaching a dummy of the virtual device to the information processing apparatus based on identification information of the virtual device, the physical device being used by an operating system of the information processing apparatus and the virtual device being available in a virtual machine running on another information processing apparatus connected via a network to the information processing apparatus,
install a device driver corresponding to the virtual device in the operating system, and
detach the dummy of the virtual device; and
a transfer unit configured to, after the dummy of the virtual device is detached, transfer memory contents and a disk image of the operating system including the device driver corresponding to the virtual device and a device driver corresponding to the physical device, to the other information processing apparatus to migrate the operating system to the other information processing apparatus,
wherein in the other information processing apparatus to which the operating system has been migrated, a process control is moved from the device driver of the physical device to the device driver of the virtual device, and the device driver of the physical device is uninstalled.

7. The information processing apparatus as claimed in claim 6, wherein the redundant configuration creating unit is configured
to obtain a redundancy scheme based on the identification information of the virtual device from a storage unit storing the redundancy scheme in association with the identification information of the virtual device, and
to create the redundant configuration based on the obtained redundancy scheme.

8. The information processing apparatus as claimed in claim 6, wherein the processor further implements a reporting unit configured to report an identifier of the created redundant configuration to the other information processing apparatus.

9. The information processing apparatus as claimed in claim 6, wherein the redundant configuration creating unit is configured to search for the virtual device corresponding to the physical device based on a device type of the physical device.

10. The information processing apparatus as claimed in claim 6, wherein the transfer unit is configured to transfer contents of a register of a CPU of the information processing apparatus to the other information processing apparatus.

11. A method performed by a computer connected via a network to another computer, the method comprising:
creating a redundant configuration including a physical device as a primary device and a virtual device corresponding to the physical device as a secondary device by attaching a dummy of the virtual device to the computer based on identification information of the virtual device, the physical device being used by an operating system of the computer and the virtual device being available in a virtual machine running on the other computer;
installing a device driver corresponding to the virtual device in the operating system;
detaching the dummy of the virtual device; and
after the dummy of the virtual device is detached, transferring memory contents and a disk image of the operating system including the device driver corresponding to the virtual device and a device driver corresponding to the physical device, to the other computer to migrate the operating system to the other computer,
wherein in the other computer to which the operating system has been migrated, a process control is moved from the device driver of the physical device to the device driver of the virtual device, and the device driver of the physical device is uninstalled.

12. The method as claimed in claim 11, further comprising:
obtaining a redundancy scheme based on the identification information of the virtual device from a storage unit storing the redundancy scheme in association with the identification information of the virtual device,
wherein the redundant configuration is created based on the obtained redundancy scheme.

13. The method as claimed in claim 11, further comprising:
reporting an identifier of the created redundant configuration to the other computer.

14. The method as claimed in claim 11, further comprising:
searching for the virtual device corresponding to the physical device based on a device type of the physical device.

15. The method as claimed in claim 11, further comprising:
transferring contents of a register of a CPU of the computer to the other computer.

\* \* \* \* \*